Figure 1:
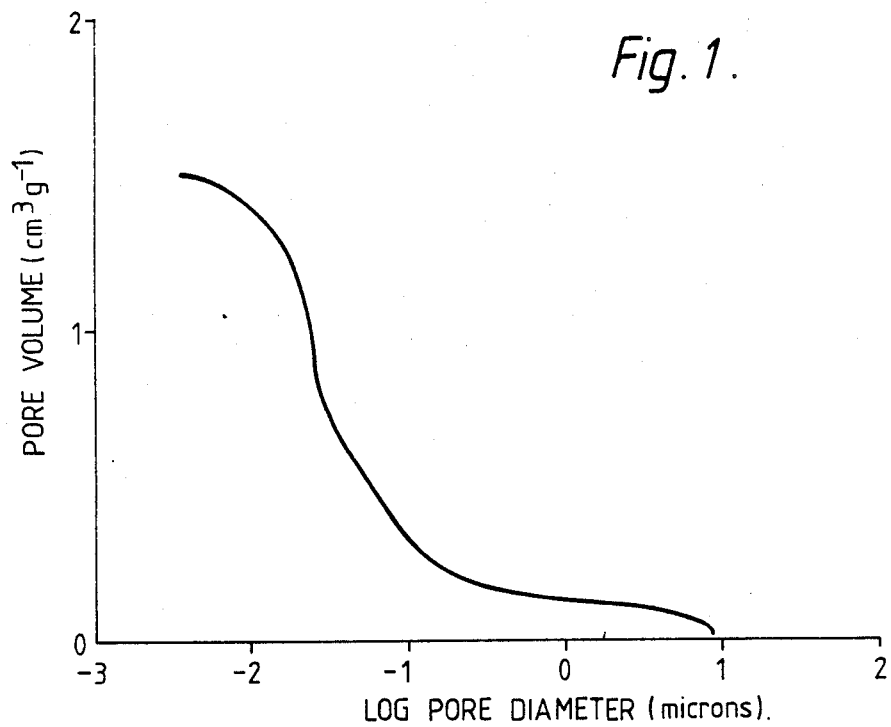

United States Patent [19]

Garvey et al.

[11] Patent Number: 4,913,966

[45] Date of Patent: Apr. 3, 1990

[54] POROUS STRUCTURES

[75] Inventors: Michael J. Garvey; Ian C. Griffiths, both of Merseyside, United Kingdom

[73] Assignee: Unilever Patent Holdings B.V., Rotterdam, Netherlands

[21] Appl. No.: 41,329

[22] Filed: Apr. 22, 1987

[30] Foreign Application Priority Data

Apr. 24, 1986 [GB] United Kingdom ............... 8610024

[51] Int. Cl.⁴ .................... B29C 67/00; C01B 33/12
[52] U.S. Cl. .................... 428/402; 264/125; 423/335; 423/338; 423/339; 428/403
[58] Field of Search .......... 428/402, 304.4, 312.6, 428/315.5, 317.9, 403; 264/109, 110, 112, 117, 125; 423/335, 338, 339

[56] References Cited

U.S. PATENT DOCUMENTS

| | | | |
|---|---|---|---|
| 2,801,902 | 10/1951 | Alexander et al. | 428/402 |
| 3,617,358 | 11/1971 | Dittrich | 264/117 |
| 4,131,542 | 12/1978 | Bergna et al. | 210/656 |
| 4,508,667 | 4/1985 | Elliott | 264/117 |
| 4,554,211 | 11/1985 | Arika et al. | 428/402 |

FOREIGN PATENT DOCUMENTS 1174103  8/1986  Japan ................... 428/402

*Primary Examiner*—William J. Van Balen
*Attorney, Agent, or Firm*—Cushman, Darby & Cushman

[57] ABSTRACT

This invention discloses novel, porous silica structures prepared from silica platelets. The structures are preferably prepared by spray-drying.

11 Claims, 3 Drawing Sheets

POROUS STRUCTURES

This invention relates to macroporous silica structures and to processes for their preparation. More particularly the invention relates to macroporous structures formed from mesoporous silica plates.

In U.S. Pat. No. 2 801 902 Alexander et al disclosed a process for the preparation of planar aggregates or mesoporous silica platelets which are platelets of silica spheroids which were produced from silica sols containing a trace amount of cationic surfactant. In their specification Alexander et al suggest that the aggregation occurs by a process of preferential, directional aggregation of the silica spheroids in the bulk of the dispersion.

The present inventors suggest that the process of aggregation of silica spheroids into apparently planar aggregates is a consequence of the partial hydrophobing of the negatively-charged silica by the adsorbed cationic surfactant and the subsequent adsorption, or deposition, of the silica particles at a gas, oil or hydrophobic solid interface, to form a compact monolayer of silica spheroids. It is thought that these silica spheroids subsequently gel to form a monolayer replica of the interface at which they have been formed. Agitation of the dispersion to rupture the interface, or to detach the monolayer from a hydrophobic substrate, which constitutes an interface, would create a fresh interface for further gelation, resulting in the eventual conversion of the silica sol to silica platelets. It is thought, therefore, that the platelets or aggregates are broken replicas of the interface. The interface may or may not be planar, but since the geometry of the interface is, in general, large in comparison with the fractured replica aggregates, these aggregates appear essentially planar in structure and, hence, may be referred to as platelets.

Accordingly, the present invention provides spheroidal porous silica structures having both macro- and mesopores and comprising a cluster of silica platelets, said platelets generating the macropores in the spaces between them and the mesopores being generated by the spaces between the silica particles forming the platelets, said mesopores interlink the macropores.

The dimensions of the spheroidal clusters of silica platelets will have a mean diameter dependent on the conditions of processing but would typically be less than 250 μm. The platelets which form the structure may be prepared in accordance with the general disclosure by Alexander et al in U.S. Pat. No. 2 801 902, but can more readily and effectively be prepared by methods which generate a large interface, such as by refluxing vigorously, aeration, or by the use of a falling film reactor or the like.

The dimensions of the silica particles constituting the platelets are generally less than 1 μm and preferably in the range 5 nm to 100 nm, more preferably 5 nm to 50 nm. Suitably the silica particles are spheroidal and of a uniform size.

The dimensions of the mesopores are determined by the dimensions of the silica particles constituting the platelets. For close packed monodispersed silica particles which are spheroidal in shape, the minimum size of the interstitial mesopore is given by the following equation:

$$a = 0.732r$$

in which a is the maximum width across the centre of the mesopore and r is the radius of the spheroidal silica particle. The maximum size of the interstitial pores will be determined by the packing of the particles. Suitably however the packing is such that the interstitial mesopores having a maximum, size of about 6 r, more suitably about 4 r. Thus for spheroidal particles having a diameter within the range 5 nm to 100 nm, the meso interstitial pores for monodisperse platelets will be in the range from about 2 to about 200 nm.

If the particles are not spheroidal or monodisperse then the average size of the mesopores will be reduced but will be readily measurable by electron microscopy or mercury porosimetry.

The minimum macropore size or inter-platelet size, corresponding to parallel plate contact is for monodisperse spheriodal particles given by the above expression. The maximum macropore size will be determined by the extent of loose packing of the platelets and will approximate to the maximum width of the platelets. This size would typically be less than 20 μm. In practice due to the random packing of the plates, which themselves will probably be buckled and creased, the inter-platelet distance will probably lie in the range 0.2 μm to 15 μm, preferably 1 to 15 μm.

This invention also provides a process for preparation of the novel porous silica structures comprising spray-drying a slurry of silica platelets. Spray-drying is carried out with an air flow at a temperature from 130° C. to 400° C. and a silica platelet dispersion at a silica concentration of less than 20% w/w.

The slurry may contain additional materials to modify aggregation behaviour. Such materials would typically be a mineral acid although other species may be used. The spheroidal clusters of platelets so produced can subsequently be strengthened by heating, preferably in a furnace at a temperature between 500° and 1,100° C.

In a preferred form of the process the silica concentration is in the range 5% to 15% w/w.

As described above the silica platelets forming part of the slurry can be formed in accordance with the general disclosure by Alexander et al in U.S. Pat. No. 2801902 or by a number of other methods. In general however the platelets are readily formed by generating an aqueous sol containing 0.1 to 10 wt % of colloidal silica and mixing therewith a small amount e.g. 0.0003 to 0.03 wt % of a cationic surfactant. Preferred cationic surfactants are organic nitrogen bases e.g. cetyl trimethyl ammonium bromide. The platelets form at for example the interface between the sol surface and air.

The present structures can incorporate material in addition to silica. In particular the present structures can be made from platelets comprising positively-charged silica particles consisting of a dense silica core coated with a poly-valent metal-oxygen compound such as alumina. The platelets can be formed in a manner analogous to that described above but using an anionic surfactant. Further details are given in our co-pending application of even date claiming priority from GB No. 86 10023.

The present invention thus provides spheroidal silica structures having a predetermined porous structure and a large internal surface area. Due to their structure the material can find uses as a carrier or support. Examples of such uses include chromatographic supports, bioseparation media and catalytic support.

Embodiments of the present invention will now be described with reference to the following Examples which are by way of example only and the following drawings; wherein:

FIGS. 1 to 6 are plots of log pore diameter in μm against pore volume in cm$^3$ g$^{-1}$ for the products of Examples 1 to 5.

EXAMPLE 1

An aqueous slurry of platelet silica was prepared by boiling under reflux, for 5 hours, a dispersion containing colloidal silica (Ludox HS40, 5.3% w/w SiO$_2$) and cetyltrimethyl ammonium bromide (0.015% w/w).

3 kg of slurry were fed into the spray dryer at a rate of 800 cm$^3$ min$^{-1}$. The operating conditions of the spray dryer were as follows:

| Inlet temperature | 318° C. |
|---|---|
| Outlet temperature | 134° C. |
| Atomiser speed | 16245 rpm |

110 g of spray-dried solid were collected. The material was examined by scanning electron microscopy and shown to consist of particles in the size range 4–125 microns (50% >38 microns) with an internal structure commensurate with a cluster of silica platelets.

The material had a total pore volume of 1.5 cm$^3$ g$^{-1}$, determined by mercury porosimetry and a pore size distribution as shown in FIG. 1. The surface area determined by nitrogen adsorption was 150 m$^2$g$^{-1}$±10%.

EXAMPLE 2

An aqueous slurry of platelet silica was prepared by boiling under reflux, for 6½ hours, a dispersion containing colloidal silica (Ludox HS40, 7.9% w/w SiO$_2$) and cetyl trimethyl ammonium bromide (0.022% w/w). The pH of the resulting platelet slurry was reduced from 10.2 to 6.6 by the addition of hydrochloric acid.

3 kg of slurry were fed into a spray dryer at a rate of 800 cm$^3$ min$^{-1}$. The operating conditions of the spray dryer were as follows:

| Inlet temperature | 306° C. |
|---|---|
| Outlet temperature | 144° C. |
| Atomiser speed | 16620 rpm |

142 g of spray-dried solid were collected. The material was examined by scanning electron microscopy which showed particles in the size range 4 to 125 microns and an internal structure as described in Example 1.

Figure 2:
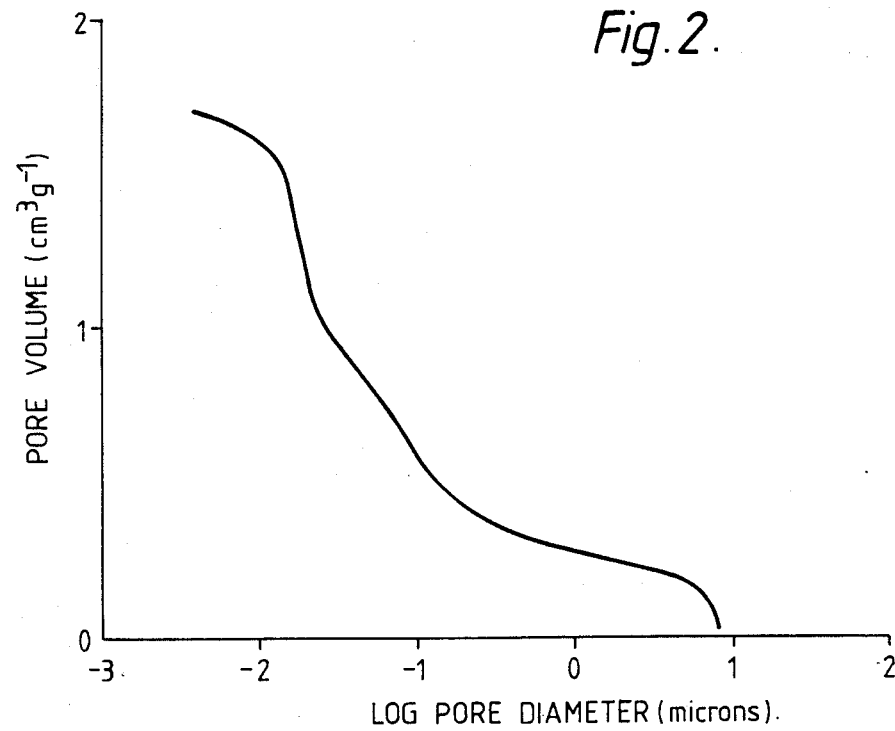

The material had a total pore volume of 1.7 cm$^3$ g$^{-1}$, determined by mercury porosimetry on particles sieved to a size range of >38 to <125 microns, and a pore size distribution as shown in FIG. 2. The surface area determined by nitrogen adsorption was 150 m$^2$g$^{-1}$ ±10%.

EXAMPLE 3

The spray-dried material prepared in Example 2 was sieved to give particles of size >45 microns and <75 microns. This material was calcined at 600° C. for 2 hours. Examination by scanning electron microscopy showed an internal structure as described in Example 1.

Figure 3:
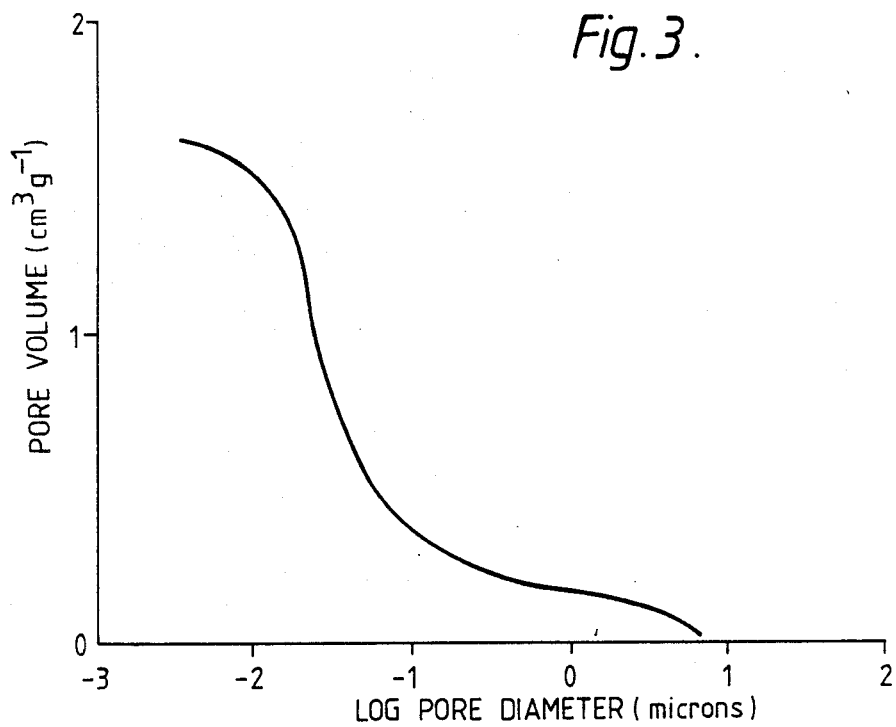

The total pore volume, determined by mercury porosimetry was 1.6 cm$^3$ g$^{-1}$, and a pore size distribution as shown in FIG. 3. The surface area, determined by nitrogen adsorption was 150 m$^2$g$^{-1}$±10%.

EXAMPLE 4

An aqueous slurry of platelet silica was prepared by boiling under reflux, for 4½ hours, a dispersion containing colloidal silica (Ludox HS40, 7.3% w/w SiO$_2$) and cetyl trimethylammonium bromide (0.02% w/w).

192 kg of slurry were removed from the reactor and the slurry pH reduced from 10.2 to 6.8 by the addition of sulphuric acid. This slurry was fed into a spray dryer at the rate of 800 cm$^3$ min$^{-1}$, and the operating conditions of the spray dryer were as follows:

| Inlet temperature | 335° C. |
|---|---|
| Outlet temperature | 132° C. |
| Atomiser speed | 16265 rpm |

Atomiser speed 16265 rpm 13 kg of the spray-dried solid were collected. Examination by scanning electron microscopy revealed an internal structure as described in Example 1.

Figure 4:
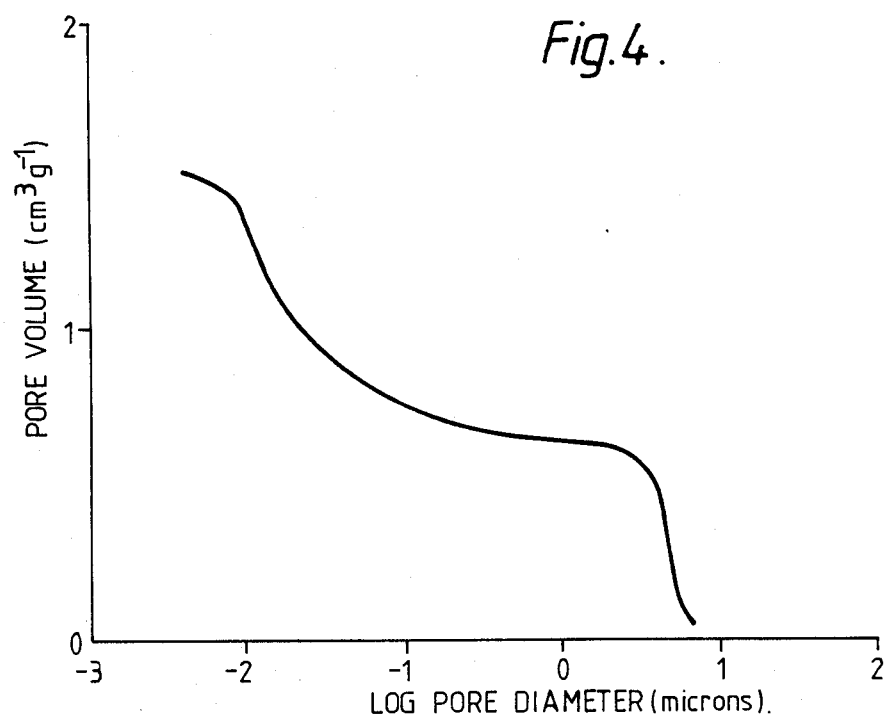

The material had a total pore volume of 1.5 cm$^3$g$^{-1}$, determined by mercury porosity and a pore size distribution as shown in FIG. 4. The surface area determined by nitrogen adsorption was 123.6 m$^2$g$^{-1}$.

The remaining slurry was boiled under reflux for a further 4½ hours. The pH of the dispersion was reduced from 10.2 to 7.2 by the addition of sulphuric acid and 148 kg were fed into a spray-dryer, at a rate of 800 cm$^3$ min$^{-1}$. The operating conditions of the spray-dryer were as follows:

| Inlet temperature | 320° C. |
|---|---|
| Outlet temperature | 135° C. |
| Atomiser speed | 16045 rpm |

8 kg of spray-dried solid were collected. 2 kg of this material were classified (Alpine classifier) into two fractions, the upper size fraction (400 g) containing particles 80% of which were between 40 and 90 microns. Examination of this material by scanning electron microscopy revealed an internal structure as described in Example 1.

Figure 5:
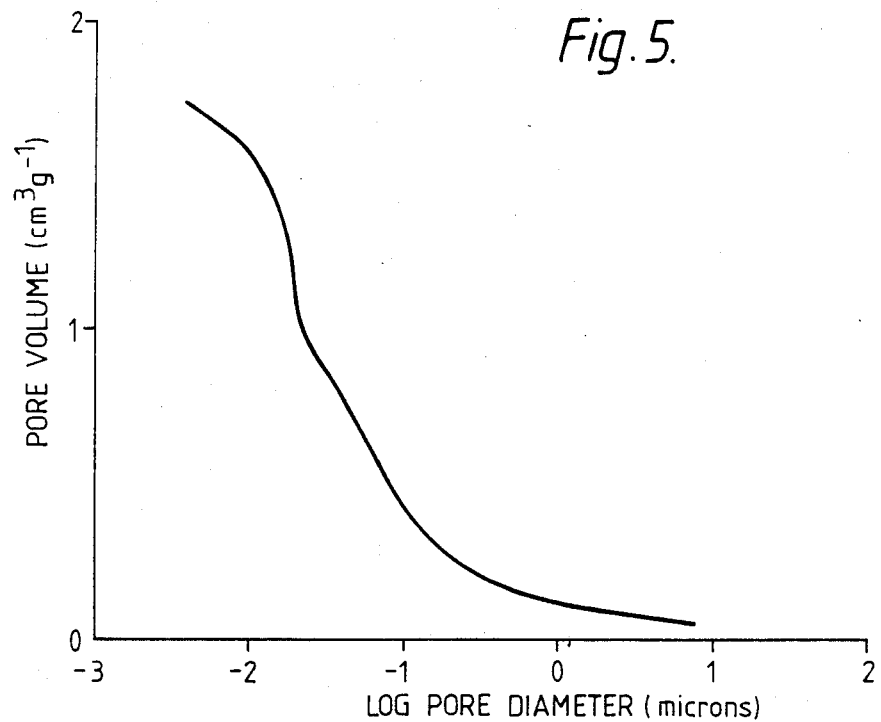

The material had a total pore volume, determined by mercury porosimetry of 1.7 cm$^3$ g$^{-1}$ and a pore size distribution as shown in FIG. 5.

EXAMPLE 5

A sample of the upper size fraction spray-dried material prepared in Example 4 was calcined at 860° C. for 2 hours.

Examination by scanning electron microscopy revealed an internal structure as described in Example 1.

Figure 6:
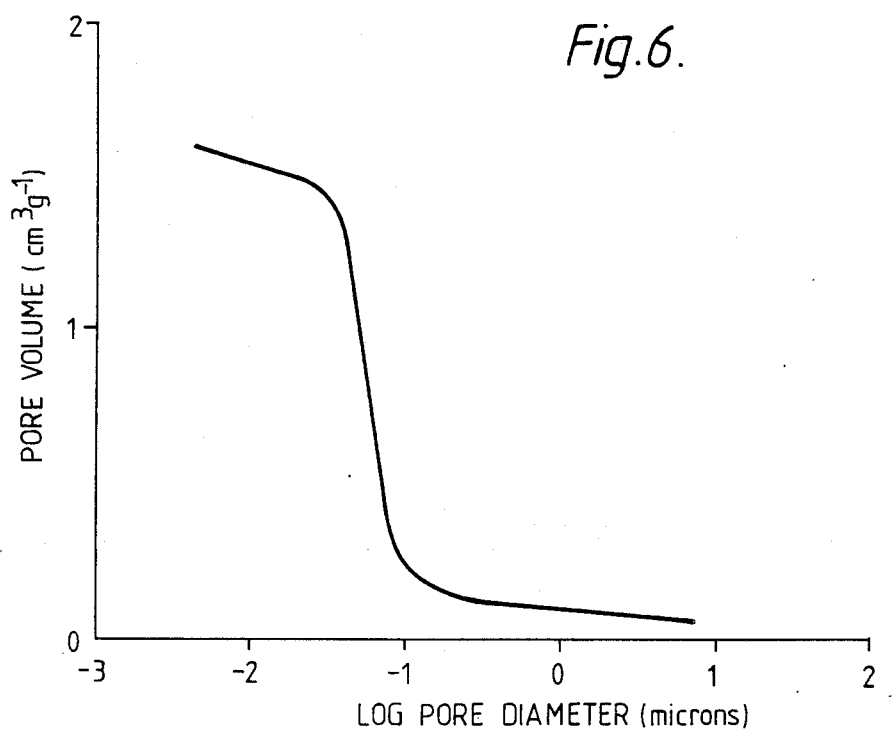

The material had a total pore volume of 1.6 cm$^3$ g$^{-1}$ determined by mercury porosimetry, and a pore size distribution as shown in FIG. 6.

The surface area determined by nitrogen adsorption was 70 m$^2$g$^{-1}$±10%.

We claim:

1. Spheroidal porous silica structures having both macro- and mesopores and comprising a cluster of silica platelets, said platelets generating the macropores in the spaces between them and the mesopores being generated by the spaces between the silica particles forming the platelets, said mesopores interlink the macropores.

2. Spheroidal porous silica structures as claimed in claim 1, having macropores of less than 20 μm.

3. Spheroidal porous silica structures as claimed in claim 1 having macropores greater than about 0.2 μm.

4. Spheroidal porous silica structures as claimed in claim 1 having mesopores in the range of from about 2 nm to about 200 nm.

5. Spheroidal porous silica structures as claimed in claim 1 wherein each platelet comprises substantially monodispersed spheroidal silica particles.

6. A process for the preparation of spheroidal porous silica structures having both macro- and mesopores and comprising a cluster of silica platelets, said platelets generating the macropores in the spaces between them and the mesopores being generated by the spaces between the silica particles forming the platelets, said mesopores interlinking the macropores, said process comprising
   (a) providing a slurry of silica platelets having mesopores between silica particles forming the platelets, and
   (b) spray drying the platelets to form the spheroidal porous silica structures.

7. A process as claimed in claim 6 in which the spray-drying is carried out with an air flow at a temperature from 130° C. to 400° C. from a platelet dispersion having a silica concentration of less than 20% w/w.

8. A process as claimed in claim 7 in which the slurry has a silica concentration between 5 and 15% w/w.

9. A process claimed in claim 6 wherein the silica platelets formed in step (b) are strengthened by heating.

10. Spheroidal porous silica structure as claimed in claim 1 wherein each of said particles forming said platelets comprises a core coated with a poly-valent metal-oxide compound.

11. A process as claimed in claim 6 wherein the silica particles forming the platelets comprise cores which have been previously coated with a poly-valent metal-oxide compound.

* * * * *